(12) United States Patent
Odell et al.

(10) Patent No.: US 8,439,605 B2
(45) Date of Patent: May 14, 2013

(54) APPARATUS FOR EVERTING A LINER INTO A PIPE AND PRESSURE CONNECTOR FOR THE SAME

(75) Inventors: Kelly Odell, Salem, OR (US); Pat J. Anderson, Salem, OR (US)

(73) Assignee: Michels Corporation, Brownsville, WI (US)

( * ) Notice: Subject to any disclaimer, the term of this patent is extended or adjusted under 35 U.S.C. 154(b) by 380 days.

(21) Appl. No.: 12/720,407

(22) Filed: Mar. 9, 2010

(65) Prior Publication Data

US 2011/0220232 A1 Sep. 15, 2011

(51) Int. Cl.
*F16L 55/18* (2006.01)

(52) U.S. Cl.
USPC .......... 405/184.2; 405/184.1; 264/36.17; 425/387.1

(58) Field of Classification Search ........ 405/150.1, 405/184.1–184.4; 285/330, 913; 138/97, 138/98; 403/298; 425/11, 503, 387.1, 392; 264/36.16, 36.17, 269
See application file for complete search history.

(56) References Cited

U.S. PATENT DOCUMENTS

| | | | |
|---|---|---|---|
| 4,135,958 A | 1/1979 | Wood | |
| 4,182,262 A | 1/1980 | Everson et al. | |
| 5,358,359 A | 10/1994 | Long, Jr. | |
| 5,374,174 A | 12/1994 | Long, Jr. | |
| 5,501,248 A | 3/1996 | Kiest, Jr. | |
| 5,700,110 A | 12/1997 | Kamiyama et al. | |
| 5,916,406 A | 6/1999 | Kamiyama et al. | |
| 6,054,180 A | 4/2000 | Kamiyama et al. | |
| 6,244,846 B1 | 6/2001 | Keller | |
| 6,390,795 B1 | 5/2002 | Waring et al. | |
| 6,539,979 B1 | 4/2003 | Driver | |
| 6,679,293 B2 | 1/2004 | Driver | |
| 6,899,832 B2 | 5/2005 | Wood | |
| 6,960,313 B2 | 11/2005 | Waring et al. | |
| 6,969,216 B2 | 11/2005 | Driver | |
| 7,108,456 B2 | 9/2006 | Driver et al. | |
| 7,124,570 B2 | 10/2006 | Blatter et al. | |
| 7,360,559 B2 | 4/2008 | Driver et al. | |
| 7,476,348 B2 | 1/2009 | Waring | |
| 7,517,212 B2 | 4/2009 | Blackmore et al. | |
| 7,527,076 B2 | 5/2009 | Lepola et al. | |
| 2003/0209823 A1* | 11/2003 | Waring et al. .......... | 264/36.17 |
| 2006/0137816 A1* | 6/2006 | Taylor et al. ............ | 156/294 |
| 2007/0114689 A1 | 5/2007 | Driver et al. | |

OTHER PUBLICATIONS

U.S. Appl. No. 60/638,402, filed Dec. 27, 2004, 12 pages.

* cited by examiner

*Primary Examiner* — Sean Andrish
(74) *Attorney, Agent, or Firm* — Michael Best & Frederick LLP

(57) ABSTRACT

An apparatus for lining a pipe, comprising a support structure, a liner secured to the support structure and having a non-everted portion and an everted portion, and a pressure connector secured to the everted portion of the liner. The pressure connector includes a connector stud positioned in an opening of the everted portion of the liner, an inner pinch plate positioned inside the liner adjacent the opening, an outer pinch plate positioned outside the liner adjacent the opening and in opposing relation to the inner pinch plate, and a compression mechanism forcing the outer pinch plate toward the inner pinch plate. Preferably, the connector stud includes splines, and the outer pinch plate includes grooves receiving the splines. The compression mechanism can include a reaction plate coupled to the connector stud and including a threaded hole engaged with a threaded member.

20 Claims, 9 Drawing Sheets

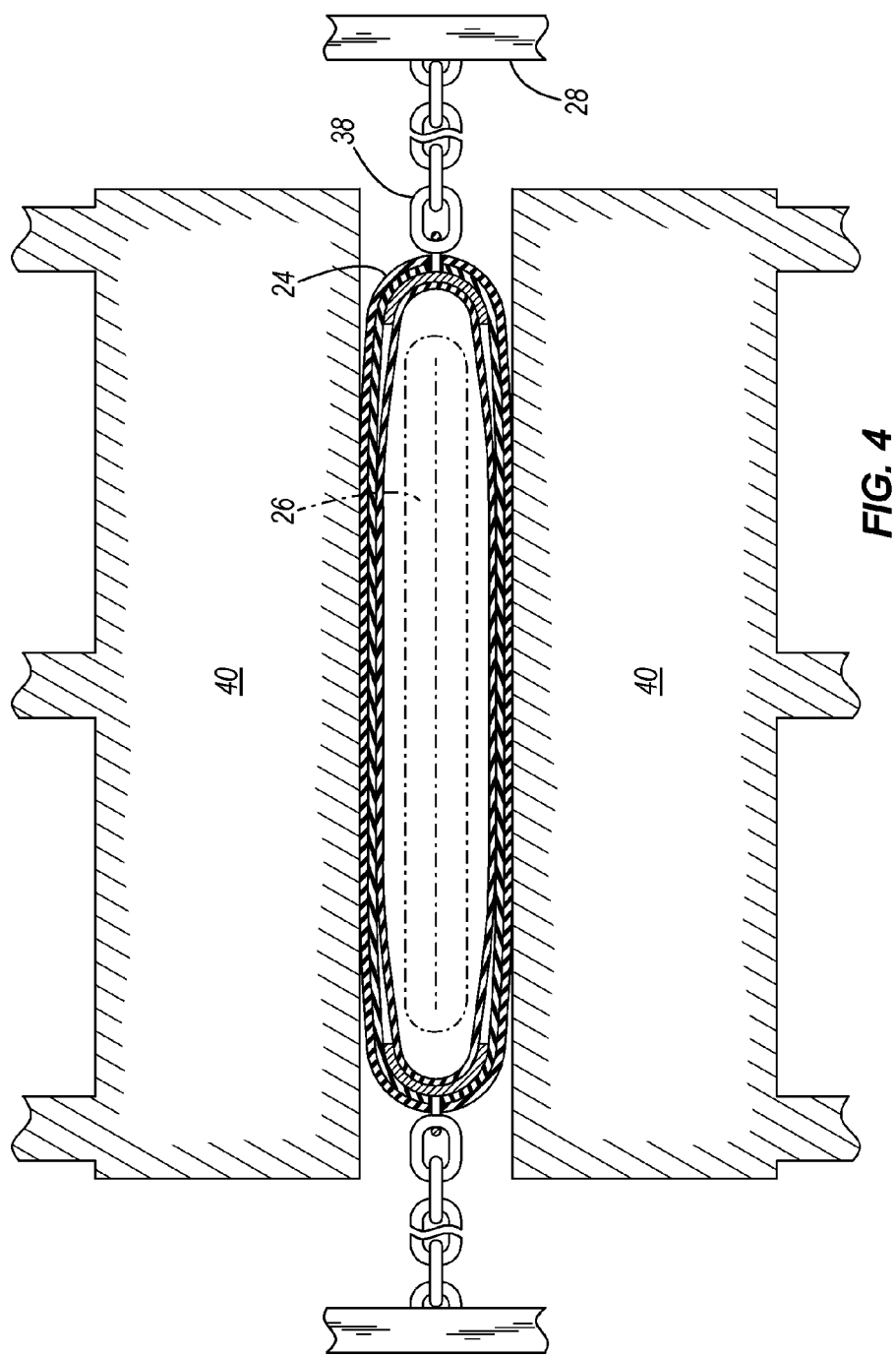

APPARATUS FOR EVERTING A LINER INTO A PIPE AND PRESSURE CONNECTOR FOR THE SAME

BACKGROUND

The present invention relates to the rehabilitation of underground pipelines, and more specifically to everting liners into pipelines, such as sewer pipes.

There are several options for dealing with a failed underground pipeline. One option is to dig up the old pipe and replace it with new pipe. Another option is to insert a liner into the old pipe. Inserting a liner into a pipe can often be done without extensive digging, and thus is a desirable alternative to replacing the pipe.

It is known to line a pipe by everting a liner into the pipe. Everting is accomplished using a specially-designed apparatus that inverts a liner and forces it into the pipe under fluid pressure. Everting apparatuses commonly include a rigid feeder tube that secures the end of the liner and provides a location for applying the pressure required to invert the liner into the pipe. One such everting apparatus is disclosed in U.S. Pat. No. 6,960,313, which is incorporated herein by reference in its entirety.

Another type of everting apparatus includes a flexible feeder made of a cloth material (e.g., similar to the material of the liner being everted). In this type of arrangement, the end of the liner is secured to the end of the flexible feeder, and a suitable pressure connector and gauge are firmly secured to the flexible feeder using bolts inserted through the sidewall of the feeder. A tube everting device like this is disclosed in U.S. Pat. No. 7,476,348, which is incorporated herein my reference in its entirety.

SUMMARY

The present invention provides an alternative approach to securing a pressure connector to a feeder on an everting apparatus. More specifically, the invention provides an apparatus for lining a pipe, comprising a support structure, a liner secured to the support structure and having a non-everted portion and an everted portion including an opening, and a pressure connector secured to the everted portion of the liner. The pressure connector includes a connector stud positioned in the opening of the everted portion of the liner, an inner pinch plate positioned inside the liner adjacent the opening (e.g., rigidly connected to an inner end of the connector stud), an outer pinch plate positioned outside the liner adjacent the opening and in opposing relation to the inner pinch plate (e.g., movable axially relative to the connector stud), and a compression mechanism forcing the outer pinch plate toward the inner pinch plate. Preferably, the connector stud includes splines, and the outer pinch plate includes grooves receiving the splines.

In one embodiment, the pressure connector further includes a skirt positioned inside the liner adjacent the opening. For example, the skirt can include a wall aligned with and oblique to the opening to thereby deflect fluid entering through the opening.

In yet another embodiment, the compression mechanism includes a threaded member applying a force to the outer pinch plate. For example, the compression mechanism can further include a reaction plate coupled to the connector stud and including a threaded hole engaged with the threaded member. Preferably, the connector stud includes splines, and the reaction plate includes grooves sized to receive the splines. In addition, the connector stud can further include an annular groove that facilitates rotational movement of the reaction plate relative to the connector stud.

Other aspects of the invention will become apparent by consideration of the detailed description and accompanying drawings.

BRIEF DESCRIPTION OF THE DRAWINGS

FIG. 4 is a section view taken along line 4-4 in FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
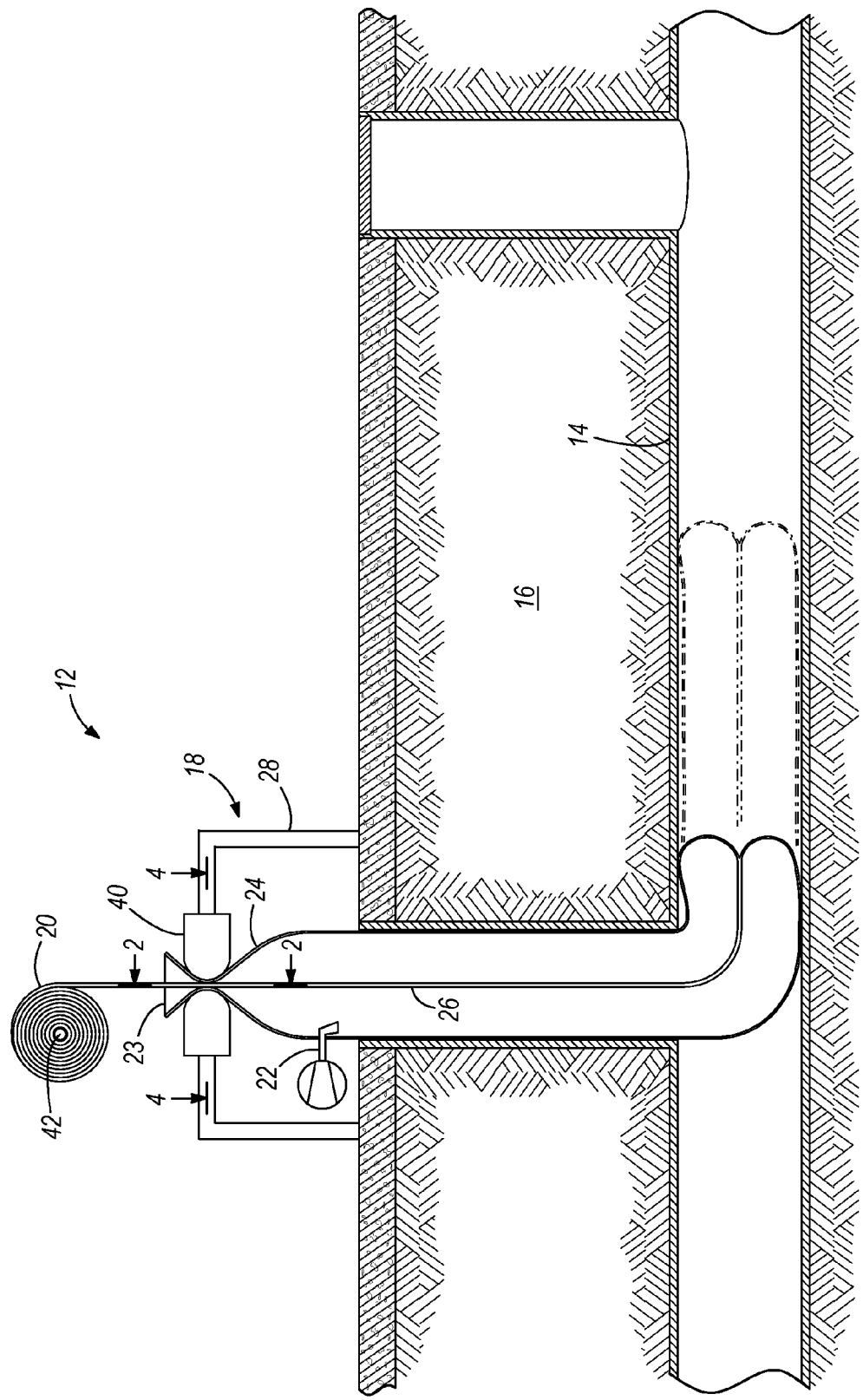
FIG. 1 is a side section view of an apparatus embodying the present invention.

FIG. 1 illustrates an apparatus 12 for lining a pipe 14 positioned in the ground 16. The apparatus generally includes a support structure 18, a liner 20 secured to the support structure, and a pressure connector 22 secured to the liner 20. As described below in more detail, this apparatus can be used to evert the liner 20 into the pipe. The liner 20 includes an open end 23 that is designed to be fed through an intake of the support structure and then inverted outwardly to create an everted portion 24 separate from a non-everted portion 26.

Figure 2:
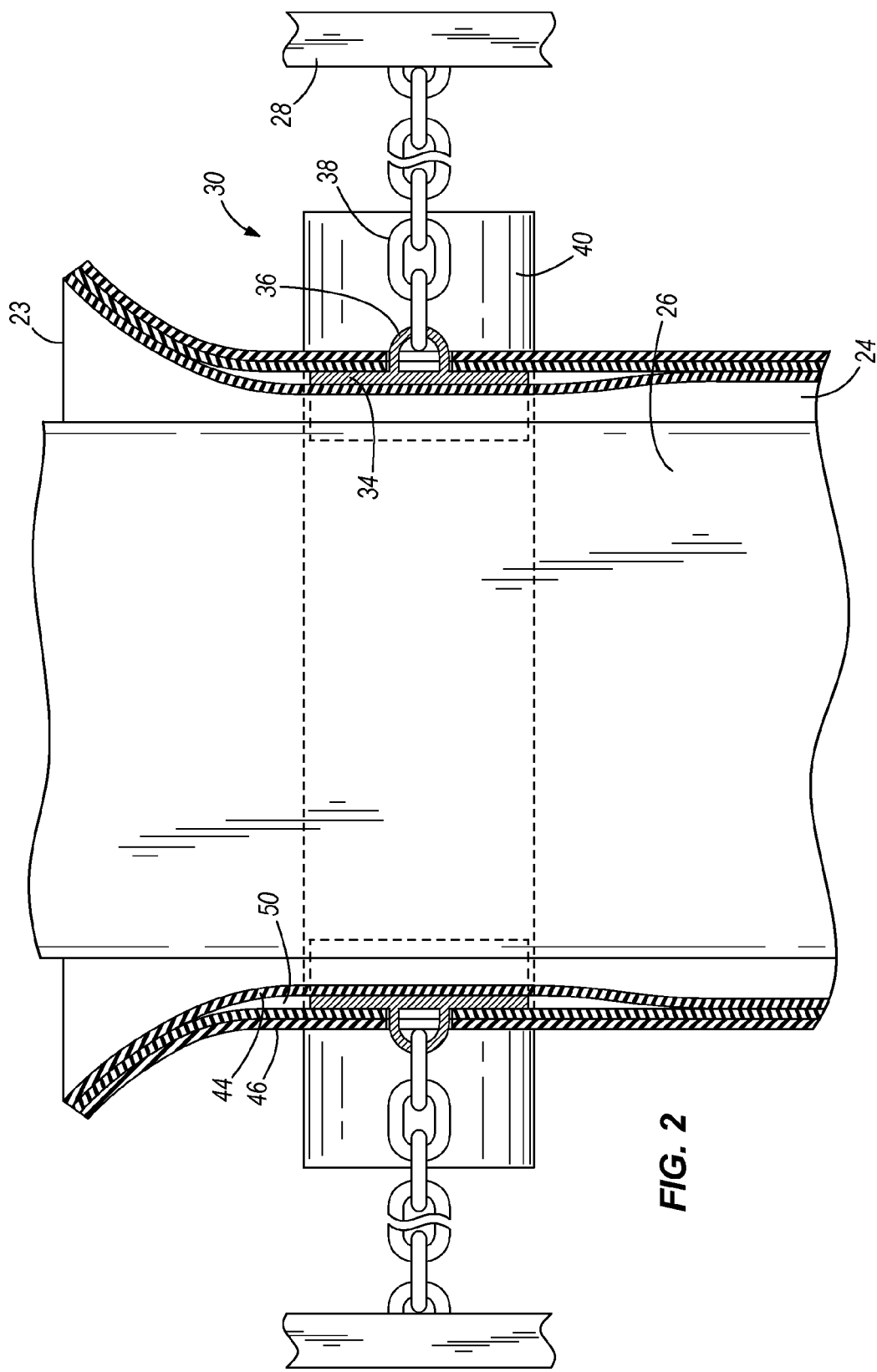
FIG. 2 is a section view taken along line 2-2 in FIG. 1.
Figure 3:
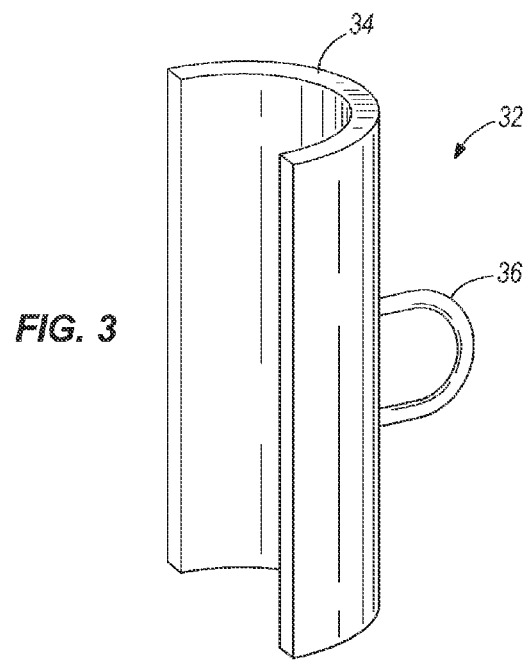
FIG. 3 is a perspective view of a stretch member.

Referring to FIG. 2, the illustrated support structure includes a frame 28 and a stretching device 30 supported by the frame 28. The illustrated stretching device 30 includes two stretch members 32, each comprising a body portion 34 and an engagement portion 36. Each illustrated body portion 34 comprises a frustocylindrical shape, which in the illustrated embodiment is a substantially semi-cylindrical member. Each illustrated engagement portion 36 is substantially U-shaped and is secured to a central part of the corresponding body portion 34. The stretching device 30 further includes a force mechanism that moves the stretch members 32 away from each other. The illustrated force mechanism comprises an elongated flexible member in the form of a chain 38 secured to each engagement portion 36. Force can then be applied to at least one of the chains 38 by any suitable means, such as with a hydraulic jack or mechanical come-along.

The illustrated support structure further includes pinchers 40 that pinch the everted portion 24 of the liner 20 in order to enhance the seal between the everted portion 24 of the liner 20 and the non-everted portion 26 of the liner 20 passing through. In the illustrated embodiment, the pinchers 40 comprise elongated cylindrical members positioned in spaced, parallel relationship on opposing sides of the stretch members 32. The pinchers 40 are designed to be movable relative to each other such that the spacing between the pinchers 40 can be adjusted in order to achieve a desired seal.

The liner 20 is an elongated, tubular-shaped member made of materials that are flexible. The liner 20 is provided in a flattened condition on a spool 42, as is known in the art. Liners for everting into an underground pipe are well known in the art, and the specifics of the liner 20 are not part of the present invention. Nevertheless, the illustrated liner 20 includes an inner layer 44 of polyurethane that is about 3 mm thick, and outer layers 46 of polyester felt that are about 6 mm thick. The outer layers 46 are formed and then the inner layer 44 is coated onto the outer layers 46 by a extrusion or hot bonding process. Liners that can be used to practice the present invention can be obtained from Applied Felts, Inc. of Martinsville, Va.

The open end of the liner 20, which is part of the everted portion 24, is secured to the stretching mechanism such that the open end of the liner 20 is forced into an almost completely flattened position. More specifically, the stretch members 32 are inserted at opposing sides of the liner 20 and are forced away from each other to thereby stretch the liner 20 and hold it in an opened, but slightly flattened position. In this position, the open end of the liner 20 is stretched slightly in order to facilitate movement of the non-everted portion 26 of the liner 20 through the open end.

Figure 6:
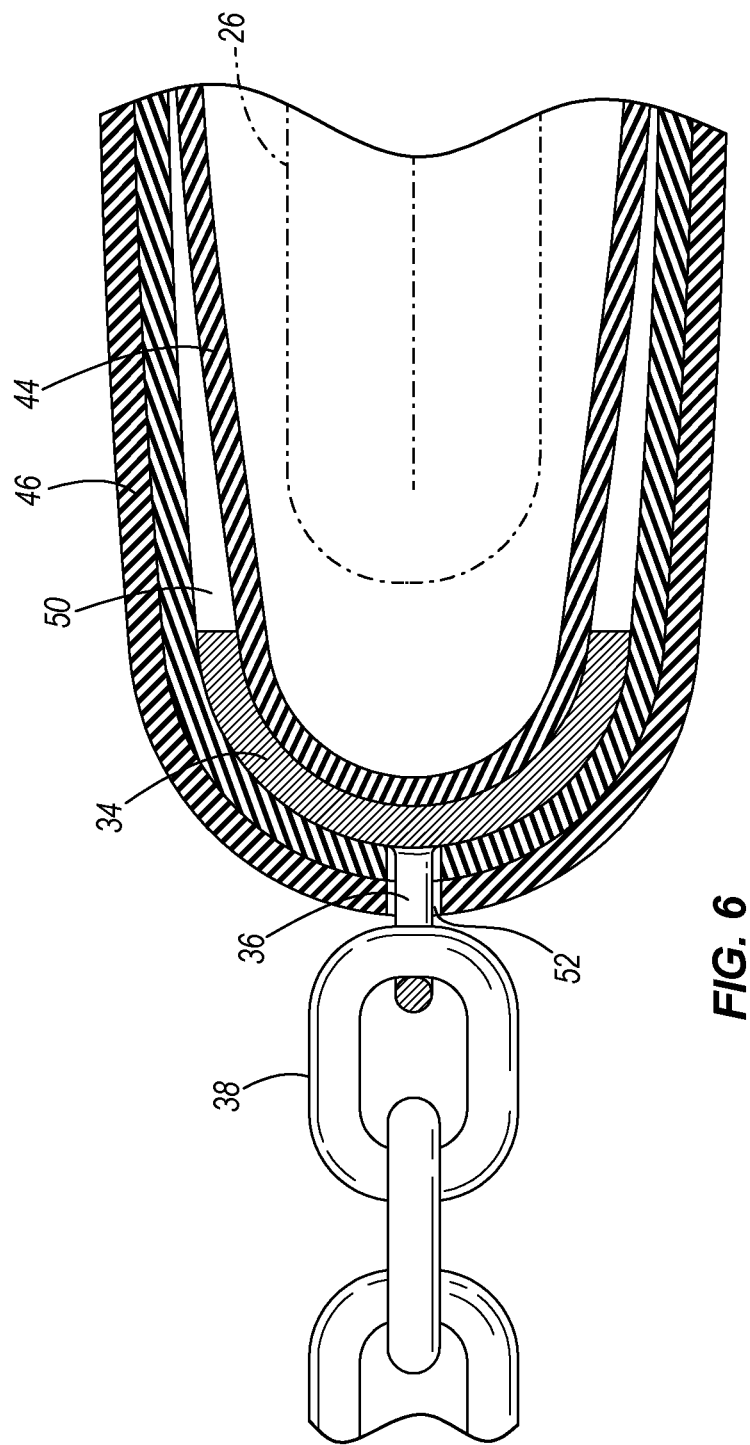
FIG. 6 is an enlarge section view of apportion of FIG. 4.
Figure 7:
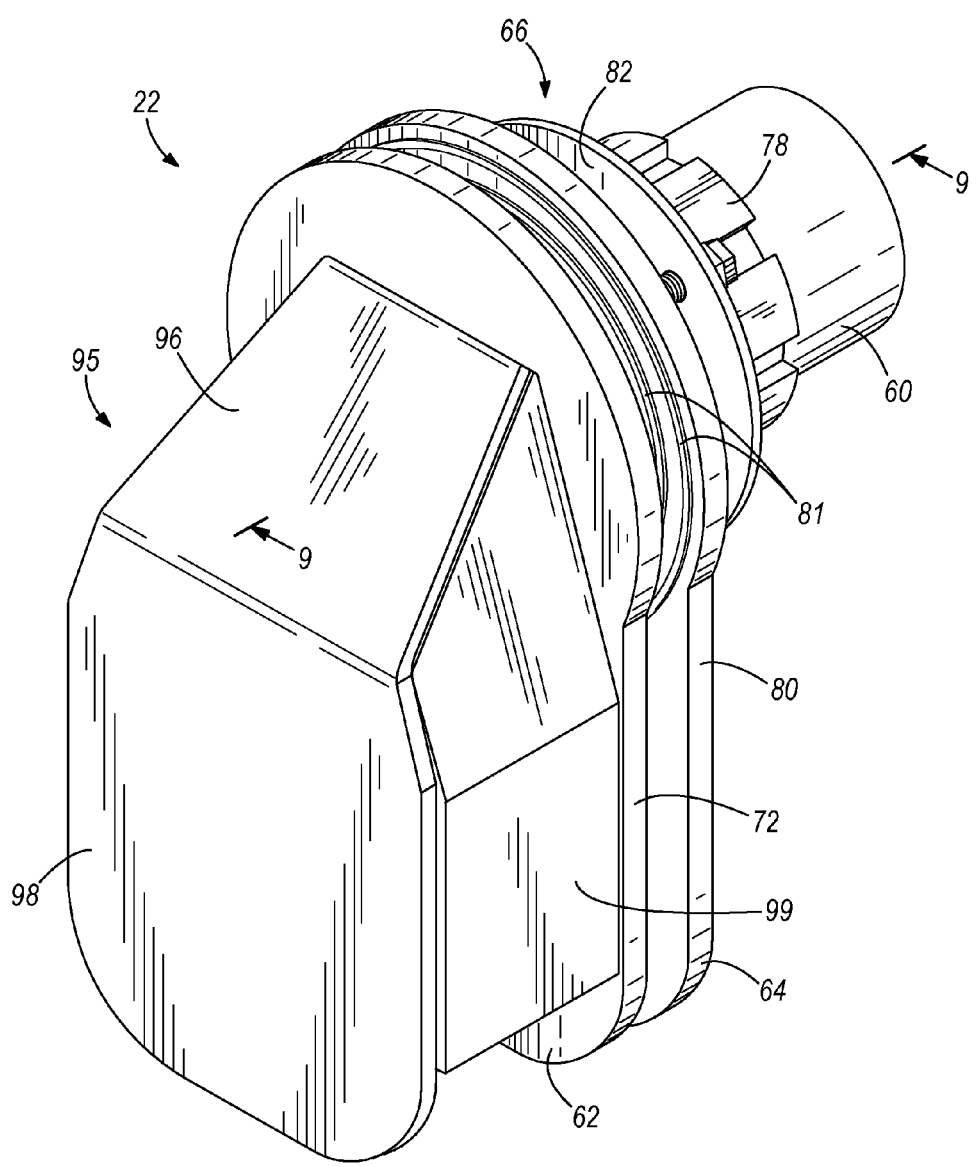
FIG. 7 is a front perspective view of a pressure connector embodying aspects of the present invention.
Figure 8:
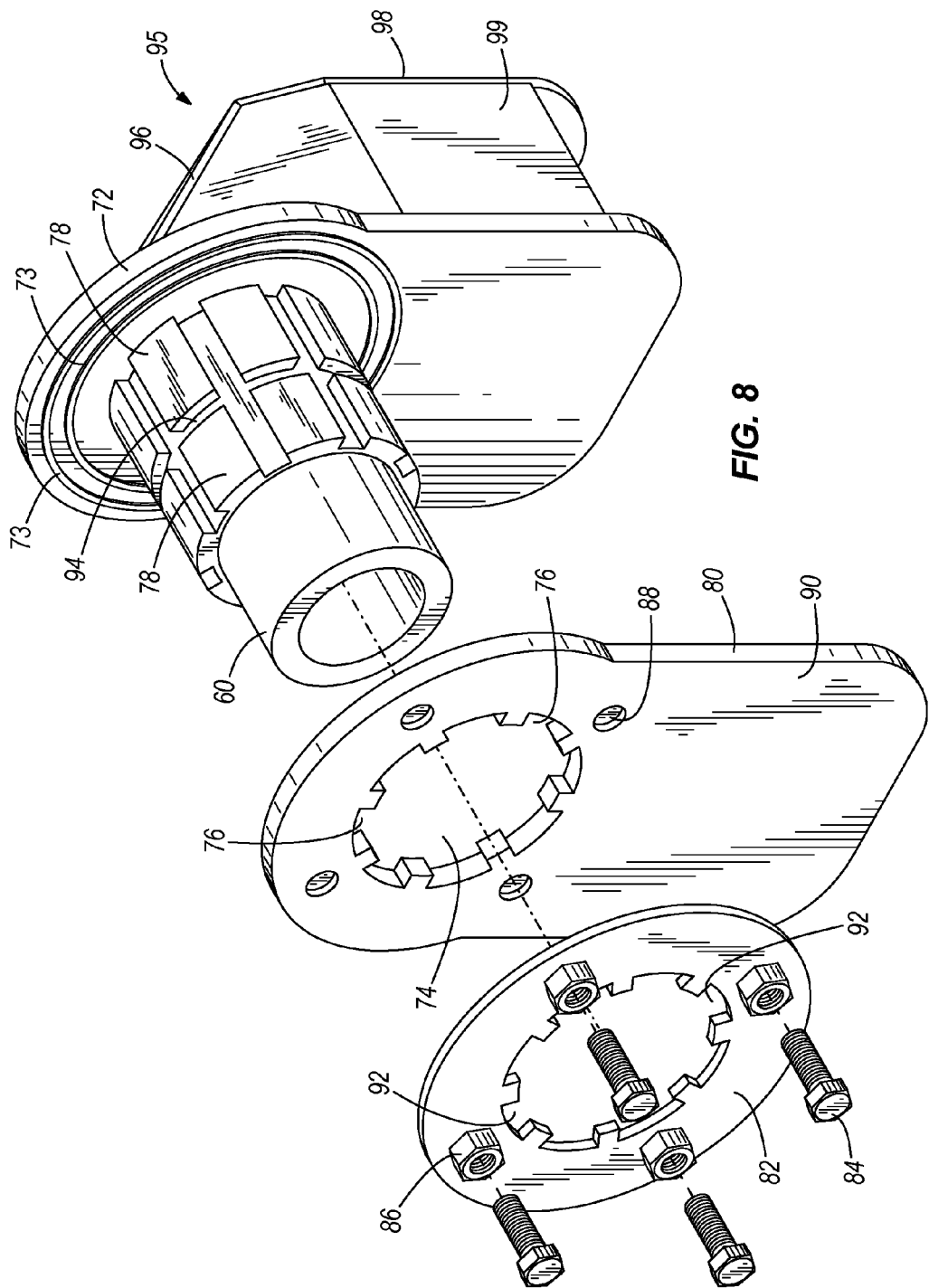
FIG. 8 is a rear exploded perspective view of the pressure connector if FIG. 2.

In the illustrated embodiment, each stretch tube is carefully positioned in the liner 20 to provide a secure engagement between the stretching mechanism and the liner 20. More specifically, each stretch tube is positioned in a void 50 between the inner layer 44 and the outer layers 46 of the liner 20. This is done by separating the inner layer 44 from the outer layers 46 to create a gap into which the stretch tube is positioned. In addition, a small opening 52 (FIG. 6) is created through the outer layers 46 to receive the engagement portion 36 of the stretch member 32 and facilitate the application of a force to the stretch member 32 via the engagement portions 36. In the illustrated embodiment, the force is applied through the chain 38 secured to the engagement portion 36.

The pressure connector 22 is secured to the everted portion 24 of the liner 20 in order to facilitate the introduction of pressurized fluid into the liner 20. The pressure connector 22 includes a connector stud 60, an inner pinch plate 62, an outer pinch plate 64, and a compression mechanism 66 positioned to force the outer pinch plate 64 toward the inner pinch plate 62.

Figure 9:
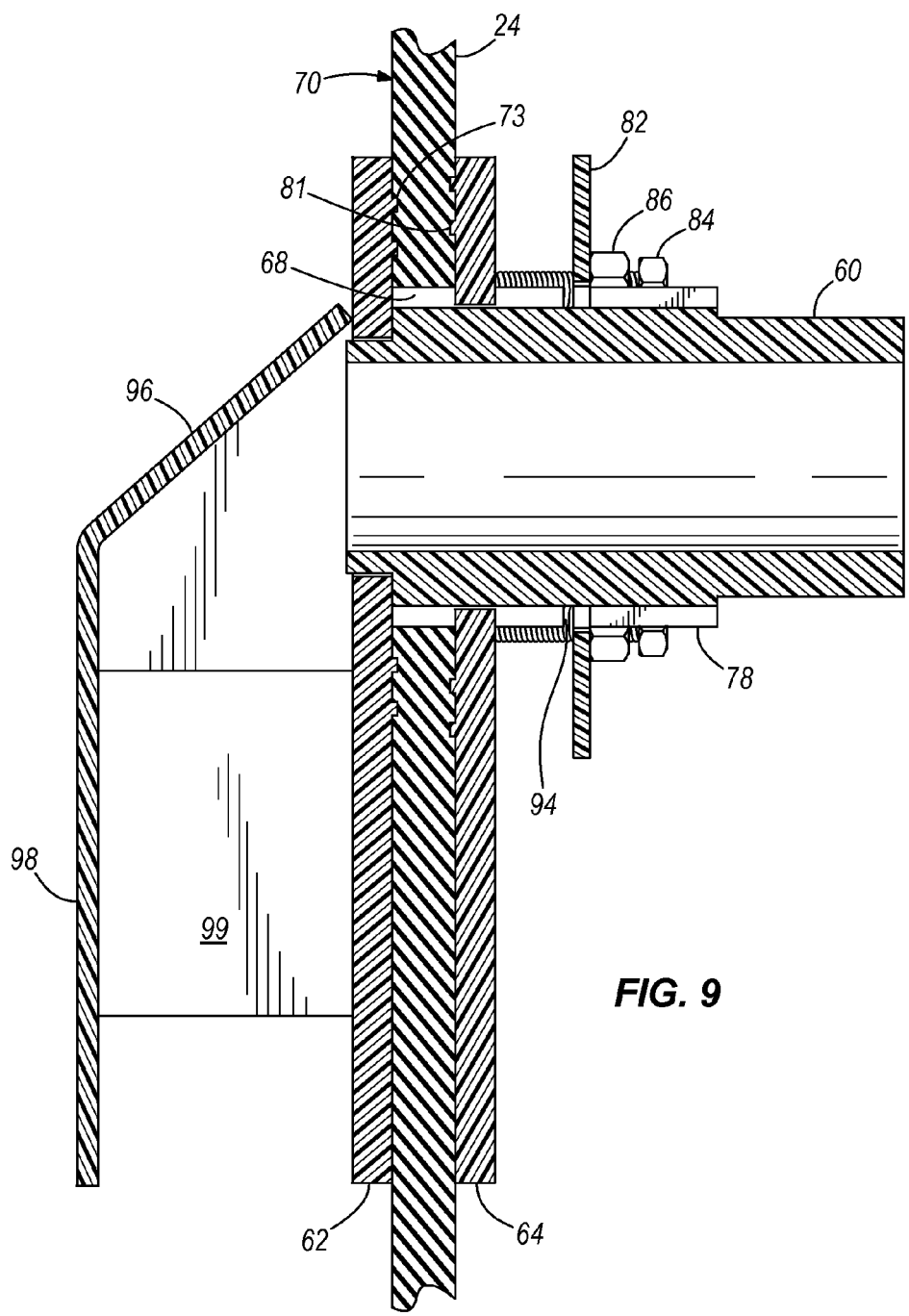
FIG. 9 is a section view taken along line 9-9 in FIG. 2.

The connector stud 60 is designed to be positioned through an opening 68 (FIG. 9) in the everted portion 24 of the liner 20. The inner pinch plate 62 is rigidly secured to an inner end of the connector stud 60, and the inner pinch plate 62 is designed to be positioned against an inner surface 70 of the everted portion 24 of the liner 20 with a majority of the connector stud 60 extending through the opening 68 and outside the liner 20. The inner pinch plate 62 has an outer periphery 72 that is shaped asymmetrically relative to the opening 68 in the liner 20, and a series of circumferential ridges 73.

The outer pinch plate 64 includes an orifice 74 that is dimensioned to receive and slide relative to the connector stud 60. More specifically, the outer pinch plate 64 includes a series of circumferentially-spaced grooves 76 that are dimensioned to receive corresponding splines 78 on the exterior surface of the connector stud 60 to thereby allow axial movement of the outer pinch plate 64 relative to the connector stud 60 and inner pinch plate 62. The outer periphery 80 of the outer pinch plate 64 is shaped substantially the same as the outer periphery of the inner pinch plate 62, and the grooves 76 and splines 78 maintain proper alignment of the inner and outer pinch plates 62,64. The outer pinch plate 64 further includes circumferential ridges 81 in opposed relation to the ridges 73 of the inner pinch plate 62.

The compression mechanism 66 includes a reaction plate 82 and a series of circumferentially-spaced bolts 84 threaded through the reaction plate 82. More specifically, the reaction plate 82 includes a series of circumferentially-spaced holes and a series of threaded nuts 86 welded in alignment with the holes. The bolts 84 are threaded into the nuts 86 such that the bolts 84 extend through the reaction plate 82. The bolts 84 are easily accessible from the outside of the liner 20 such that the bolts 84 can be rotated to adjust the length of the bolt extending beyond the reaction plate 82. The ends of the bolts 84 are designed to engage small recesses 88 in the outer surface 90 of the outer pinch plate 64 such that threading of the bolts 84 into the reaction plate 82 will force the outer pinch plate 64 toward the inner pinch plate 62 to sandwich the everted portion 24 of the liner 20 in between.

Similar to the outer pinch plate 64, the inner periphery of the reaction plate 82 includes a series of grooves 92 that are adapted to receive the splines 78 on the connector stud 60 to facilitate axial movement of the reaction plate 82 relative to the connector stud 60. The connector stud 60 further includes an annular groove 94 having a thickness sufficient to allow rotation of the reaction plate 82 relative to the connector stud 60 when the reaction plate 82 is aligned with the annular groove 94. In order to couple the reaction plate 82 to the connector stud 60, the reaction plate 82 is slid onto the end of the connector stud 60 until the reaction plate 82 is aligned with the annular groove 94, and then the reaction plate 82 is rotated until the grooves 92 of the reaction plate 82 are misaligned with the splines 78 on the connector stud 60 to thereby inhibit axial movement of the reaction plate 82 relative to the connector stud 60. In this way, the reaction plate 82 provides an axially-stable structure against which the bolts 84 will apply a reaction force when forcing the outer pinch plate 64 toward the inner pinch plate 62.

Figure 10:
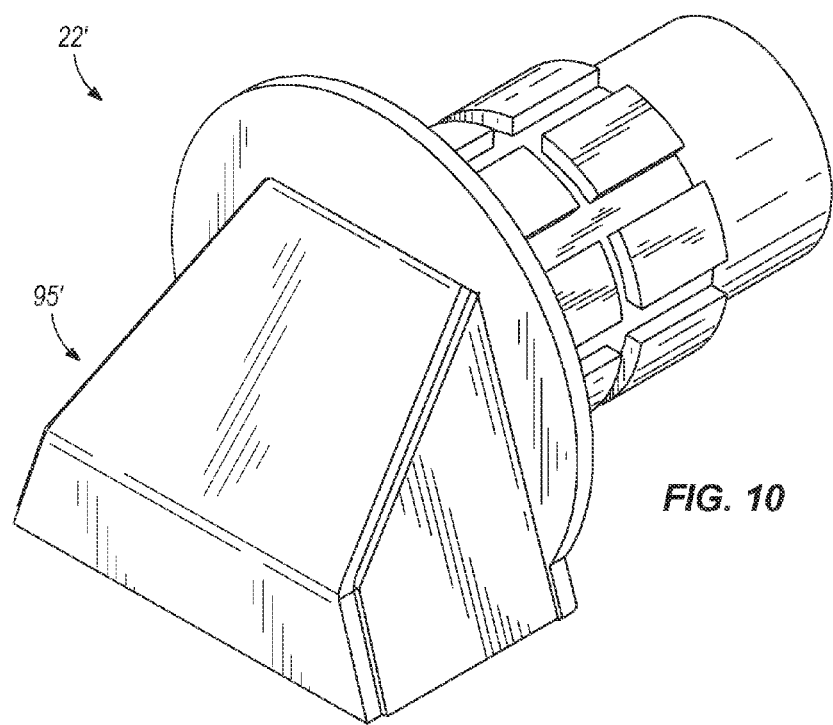
FIG. 10 is a front perspective view of a different pressure connector embodying aspects of the present invention.
Figure 5:
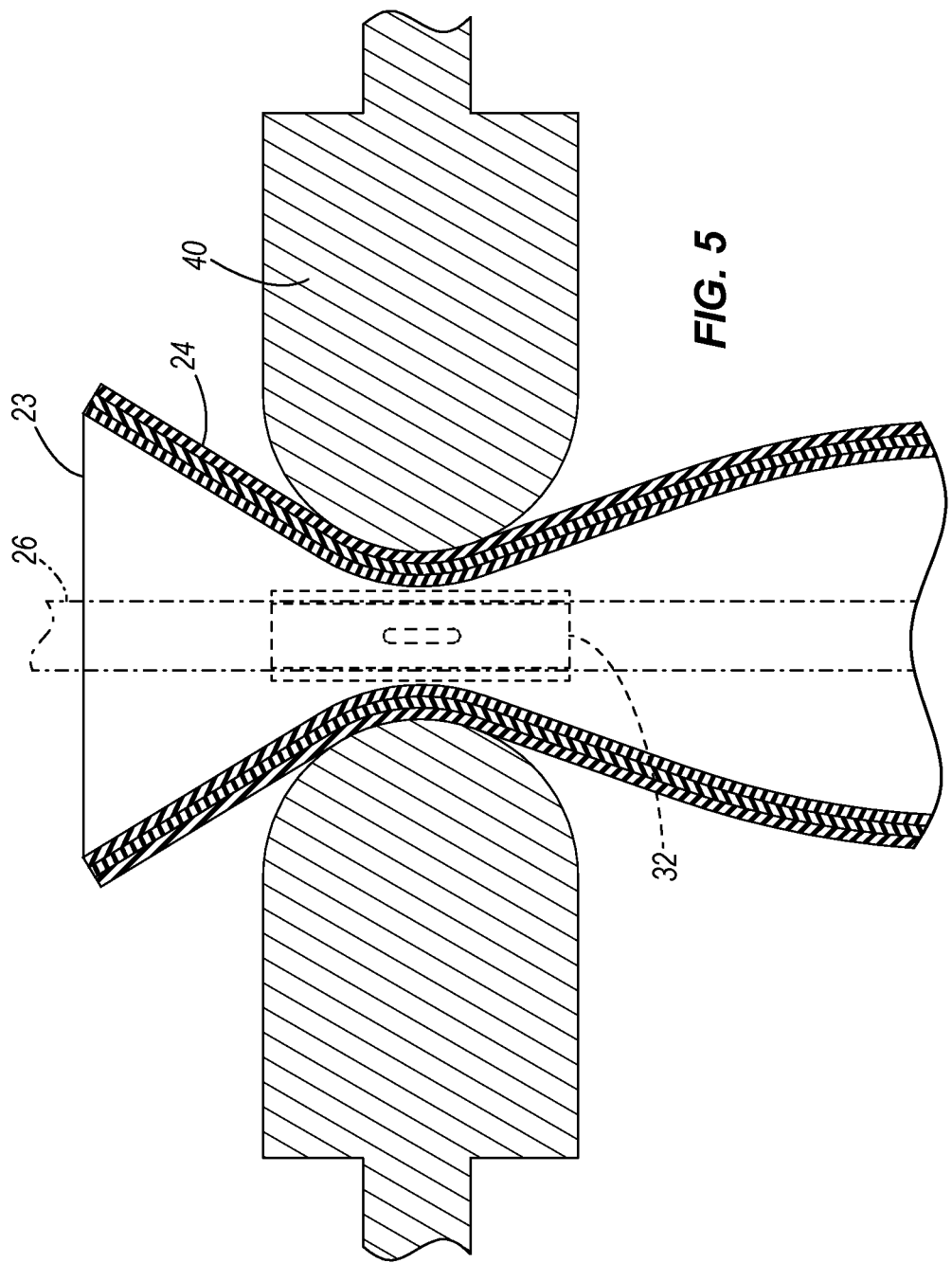
FIG. 5 is section view taken normal to the sections in FIGS. 2 and 4.

The pressure connector 22 further includes a skirt 95 secured to the inner pinch plate 62. The skirt 95 is designed to direct pressurized fluid as it enters the liner 20 through the connector stud 60. The skirt 95 includes an oblique wall 96 positioned in alignment with the axis of the connector stud 60 to thereby deflect fluid entering through the connector stud 60. The skirt 95 further includes a parallel portion 98 that is an extension of the oblique wall 96 and is substantially parallel to the inner pinch plate 62, and sidewalls 99. The skirt 95 is designed to direct the pressurized fluid away from the open end of the liner 20 and toward the portion of the liner 20 that is being everted (i.e., at the transition between the non-everted portion 26 of the liner 20 and the everted portion 24 of the liner 20.) FIG. 10 illustrates a similar pressure connector 22' including a relatively shorter skirt 95'.

The above-described structure is secured to the liner 20 as follows. First, the liner 20 is fed through the support structure 18, and the open end 23 of the liner 20 is everted outwardly to create the everted portion 24 separate from the non-everted portion 26. At the open end 23, the inner layer 44 is separated from the outer layer(s) 46 at two opposing locations to create two opposing voids 50. An opening is created through the outer layer(s) 46 at each of the opposing locations. A stretch member 32 is then positioned in each void 50, and the engagement portion 36 of each stretch member 32 is inserted through the corresponding opening 52 in the outer layers 46. The chains 38 are then secured to each engagement portions 36, and force is applied to at least one of the chains 38 to force the stretch members 32 away from each other to stretch the everted portion 24 of the liner 20. The pinchers 40 can then be brought toward each other to compress the sidewalls of the liner 20 to achieve the desired compression on the liner 20.

Another opening 68 is created in the sidewall of the everted portion 24 of the liner 20. The connector stud 60 and inner pinch plate 62 are then positioned adjacent the inner surface 70 of the everted portion 24 of the liner 20, and the connector stud 60 is inserted through the opening in the liner 20 until the inner pinch plate 62 is contacting the inner surface 70 of the everted portion 24 of the liner 20. The outer pinch plate 64 is then slid onto the connector stud 60 in a rotational orientation that is aligned with the inner pinch plate 62. The reaction plate 82 is then slid onto the connector stud 60 until it is aligned with the annular groove 94. The reaction plate 82 is then rotated to a point where the reaction plate 82 is prevented from moving axially relative to the connector stud 60. The bolts 84 can then be threaded through the reaction plate 82 until the ends of the bolts 84 contact the outer pinch plate 64. Further threading of the bolts 84 into the reaction plate 82 will force the outer pinch plate 64 toward the inner pinch plate 62 to squeeze the sidewall of the everted portion 24 of the liner 20 between the pinch plates 62,64. The circumferential ridges 73,81 of the inner and outer pinch plates 62,64 will dig into the sidewall of the liner 20 to create a sealed engagement between the pressure connector 22 and the liner 20.

Various features and advantages of the invention are set forth in the following claims.

What is claimed is:

1. An apparatus for lining a pipe comprising:
a support structure;
a liner secured to the support structure and having a non-everted portion and an everted portion including an opening; and
a pressure connector secured to the everted portion of the liner, the pressure connector including:
   a connector stud positioned in the opening of the everted portion of the liner;
   an inner pinch plate positioned inside the liner adjacent the opening;
   an outer pinch plate positioned outside the liner adjacent the opening and in opposing relation to the inner pinch plate; and
   a compression mechanism including a reaction plate coupled to the connector stud, the reaction plate supporting a forcing element such that the reaction plate and the forcing element are movable together with respect to the inner and outer pinch plates to force the outer pinch plate toward the inner pinch plate.

2. The apparatus for lining a pipe as claimed in claim 1, wherein the pressure connector further includes a skirt positioned inside the liner adjacent the opening.

3. The apparatus for lining a pipe as claimed in claim 2, wherein the skirt includes a wall aligned with and oblique to the opening to thereby deflect fluid entering through the opening.

4. The apparatus for lining a pipe as claimed in claim 1, wherein the inner pinch plate is rigidly secured to an inner end of the connector stud.

5. The apparatus for lining a pipe as claimed in claim 1, wherein the inner pinch plate includes an orifice aligned with the connector stud.

6. The apparatus for lining a pipe as claimed in claim 5, wherein an outer periphery of the inner pinch plate is asymmetric with respect to the orifice.

7. The apparatus for lining a pipe as claimed in claim 1, wherein the connector stud defines an axis, and wherein the outer pinch plate is movable along the axis relative to the connector stud.

8. The apparatus for lining a pipe as claimed in claim 7, wherein the connector stud includes splines, and wherein the outer pinch plate includes grooves receiving the splines.

9. The apparatus for lining a pipe as claimed in claim 8, wherein the reaction plate includes grooves sized to receive the splines.

10. The apparatus for lining a pipe as claimed in claim 9, wherein the connector stud further includes an annular groove that facilitates rotational movement of the reaction plate relative to the connector stud.

11. The apparatus for lining a pipe as claimed in claim 1, wherein the forcing element includes a threaded member applying a force to the outer pinch plate.

12. The apparatus for lining a pipe as claimed in claim 11, wherein the reaction plate includes a threaded hole engaged with the threaded member.

13. A pressure connector adapted to be secured to a flexible material for providing pressurized fluid from one side of the material to the other side of the material, the pressure connector comprising:
a connector stud including an inner end and an outer end and defining an axis;
an inner pinch plate secured to the inner end of the connector stud;
an outer pinch plate spaced from the inner pinch plate and movable relative to the inner pinch plate along the axis;
a threaded member contacting and applying a force to the outer pinch plate to move it toward the inner pinch plate; and
a skirt secured to the inner pinch plate and adapted to be positioned inside the flexible material adjacent an opening of the flexible material;
wherein the skirt includes a wall aligned with and oblique to the opening.

14. The pressure connector as claimed in claim 13, wherein the inner pinch plate is rigidly secured to an inner end of the connector stud.

15. The pressure connector as claimed in claim 13, wherein the inner pinch plate includes an orifice aligned with the connector stud.

16. The pressure connector as claimed in claim 15, wherein an outer periphery of the inner pinch plate is asymmetric with respect to the orifice.

17. The pressure connector as claimed in claim 13, wherein the outer pinch plate is movable along the axis relative to the connector stud.

18. The pressure connector as claimed in claim 17, wherein the connector stud includes splines, and wherein the outer pinch plate includes grooves receiving the splines.

19. An apparatus for lining a pipe comprising:
a support structure;
a liner secured to the support structure and having a non-everted portion and an everted portion including an opening; and
a pressure connector secured to the everted portion of the liner, the pressure connector including:
   a connector stud positioned in the opening of the everted portion of the liner;
   an inner pinch plate positioned inside the liner adjacent the opening;
   an outer pinch plate positioned outside the liner adjacent the opening and in opposing relation to the inner pinch plate;
   a compression mechanism forcing the outer pinch plate toward the inner pinch plate; and
   a skirt positioned inside the liner adjacent the opening;

wherein the skirt includes a wall aligned with and oblique to the opening to thereby deflect fluid entering through the opening.

20. The apparatus for lining a pipe as claimed in claim 19, wherein the inner pinch plate includes an orifice aligned with the connector stud, and an outer periphery of the inner pinch plate is asymmetric with respect to the orifice.

* * * * *